Nov. 24, 1970     J. F. SHERWOOD     3,543,146

MAGNETIC POLE INDICATOR

Filed Nov. 27, 1968

INVENTOR.
John F. Sherwood
BY Bertha L. MacGregor
ATTORNEY

United States Patent Office 3,543,146
Patented Nov. 24, 1970

3,543,146
MAGNETIC POLE INDICATOR
John F. Sherwood, 130 S. Sandalwood Place,
Glendora, Calif. 91740
Filed Nov. 27, 1968, Ser. No. 779,564
Int. Cl. G01r 33/02
U.S. Cl. 324—48                    6 Claims

ABSTRACT OF THE DISCLOSURE

A magnetic pole indicator comprising an indicator-containing housing through which the indicator is visible, the indicator being made of material having opposite polar side surfaces, an external magnetic pole for exerting attractive or repellant magnetic influence relatively to the indicator, and means for reversing the polarity of the external magnetic pole, said indicator being movable within the housing and confined thereby within the magnetic field between the indicator and external pole, whereby the indicator is caused to turn over from one side surface to the other when the external pole is in pole repelling position relatively to the indicator and thus visually indicates which of its polar sides is like or unlike the facing pole of the external pole.

---

This invention relates to magnetic pole indicators, useful in the identification of the polarity of magnetic members, in the operation of games and display boards, and for other purposes.

When used for the identification of the polarity of magnetic members, the invention comprises an external magnetic pole and a housing enclosed indicator, the polarity of one of the members being known and the other unidentified. For example, the external member may have its pole faces marked to visually identify them. When the external pole member is placed in proximity to the magnetic indicator and sufficiently near the indicator to be within the field of magnetic influence the attractive and repellant influences become effective, so that the indicator is repelled when facing the like pole of the external pole, and attracted when facing the unlike pole of the external pole. Thus the polarity of the indicator can be identified, and the indicator can be marked if desired. If the polarity of both members is unidentified, they can be matched by corresponding colors or numerals to indicate which of their poles are alike and which are unlike.

The magnetic pole indicator of my invention comprises means for housing the magnetic indicator in such manner that, when repelled by the external magnetic pole, the indicator is prevented from moving out of the field of magnetic influence between them and is caused to turn or "flip" over. This occurs when the facing poles of the indicator and external pole member are alike.

If an external pole member is not visually marked to identify its polarity, it may bear distinguishing colors, numerals or other markings on opposite faces. When placed in proximity to the magnetic indicator, the like and unlike poles of the two members can be determined by the attracting or repelling effect of the facing poles, though not necessarily identifying the attracted poles as either north or south.

The external pole affecting the indicator may be a permanent magnet or an electro-magnet.

The indicator may be used to check the polarity of D.C. voltage. If the indicator is repelled and caused to turn over, it indicates that the polarity of the D.C. voltage matches the polarity of the indicator side which initially faced the electro-magnet controlled by the D.C. current.

The indicator may also be used in playing games in which opposite sides of the indicator may bear numerals, letters, colors or other indicia, which become visible to the players when the indicator is actuated by the repelling influence of the external pole. When used in games, the indicator also is useful in indentifying the unidentified poles of magnetic game pieces.

The invention may be embodied in an electronic display board provided with indicator discs having contrasting colored opposite sides, which are housed so as to turn over or "flip" when repelled by external poles which may be permanent magnets or electro-magnetic coils, the board having a colored surface which matches one of the indicator sides, whereby turning of indicators produces various designs or symbols.

In the drawing:

FIGS. 1 and 2 are vertical sectional views of the magnetic pole indicator in which the external pole is an electro-magnetic coil, showing in FIG. 1 the attracted positions of the magnetic indicator and the external pole with their facing poles unlike, and showing in FIG. 2 the positions of the parts after the external pole has been reversed, and the magnetic indicator has been repelled and caused to turn over from the FIG. 1 position to the FIG. 2 position during the period when the like poles of the two members were facing each other.

FIGS. 3 and 4 are views similar to FIGS. 1 and 2, respectively, but showing a permanent magnet as the external pole instead of the electro-magnet of FIGS. 1 and 2.

FIG. 7 is a view similar to FIG. 5, showing that different forms of housing for the magnetic indicator may be employed for use in games and the like.

Figure 1:
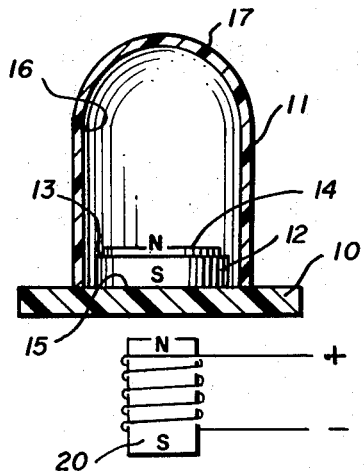
Figure 2:
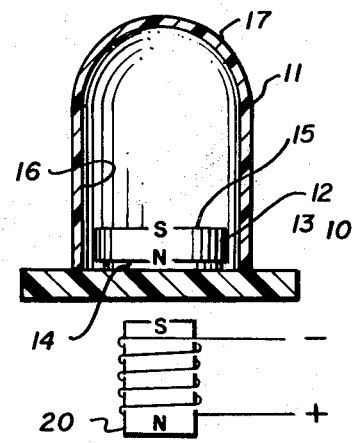

In the embodiment of the invention shown in FIGS. 1 and 2, a base 10 and housing 11 mounted on the base are made of conductive or non-conductive material which is transparent or sufficiently so to make visible the magnetic indicator 12 located within the housing. The indicator 12 preferably is a losse circular disc of permanently magnetic material which may be of uniform diameter or may be offset at 13 as shown to aid in distinguishing one side 14 from the other side 15. In FIG. 1 the north pole face 14 of the indicator 12 faces upwardly and the south pole face 15 downwardly. The inner surfaces 16 of the side walls of the housing 11 are spaced from the peripheral surface of the magnetic indicator 12 a distance sufficient to permit the indicator to turn over into the position shown in FIG. 2, where the north pole face 14 of the indicator faces downwardly and the south pole face 15 upwardly. The interior height of the housing 11 also is greater than the diameter of the indicator 12 so as not to interfere with the free turning over of the indicator disc.

The distance between the top 17 of the housing 11 and the base 10 may be substantially greater than the diameter of the indicator 12 without affecting the operation of the indicator, but the distance between the interior surfaces 16 of the side walls and the peripheral surface of the indicator must be limited so that the indicator, when repelled, cannot move sidewise out of the field of magnetic influence. The indicator must be confined by the housing within the field of magnetic influence established when external pole means are located in the proximity of the indicator. When the facing poles of the indicator and the external pole are alike, the indicator and external pole are attracted to each other. When the facing poles are unlike, the indicator is repelled and seeks to move out of the magnetic field. Since it is confined by the housing, the indicator turns over from one major side to the other when repelled.

Figure 3:
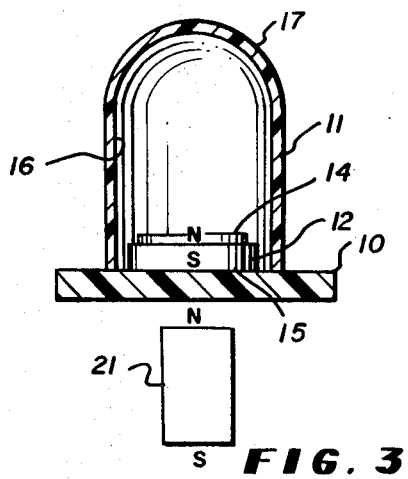
Figure 4:
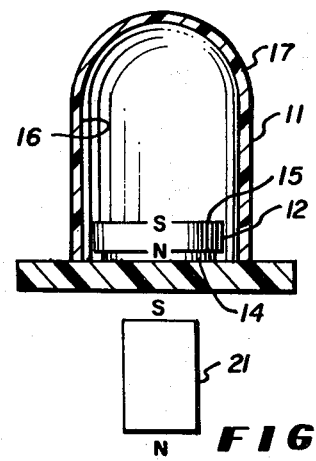
Figure 5:
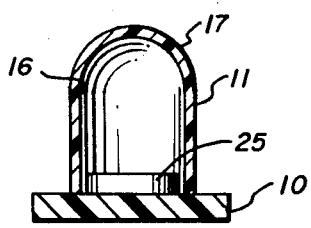
FIG. 5 is a vertical sectional view of an indicator and its housing, portraying the indicator which may have different colored opposite sides not necessarily identified as either north or south poles.

The external magnetic pole may be an electromagnetic coil 20 such as shown in FIGS. 1 and 2, or a permanent magnet 21, as shown in FIGS. 3 and 4. The base 10, housing 11 and magnetic indicator 12, in FIGS. 3 and 4, are the same as the similarly designated parts of FIGS. 1 and 2. The poles of the electro-magnet 20 are reversed by reversing the current, as indicated in FIGS. 1 and 2, and the poles of the permanent magnet 21 are reversed by rotating the device as indicated in FIGS. 3 and 4. In either of the examples of my indicator shown in these figures, the indicator 12 may be a disc of uniform diameter and may have its opposite major surfaces 14, 15, distinguished by colors, letters, symbols or other markings or contours. This also applies to the embodiment shown in FIG. 5, where the indicator 25 is a disc of uniform diameter.

Figure 6:
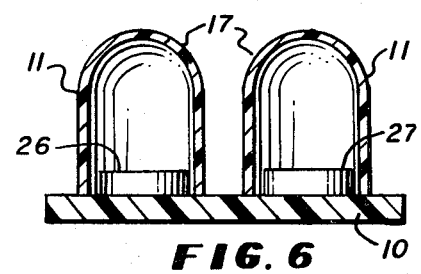
FIG. 6 is a vertical sectional view showing two indicators on a single base.
Figure 7:
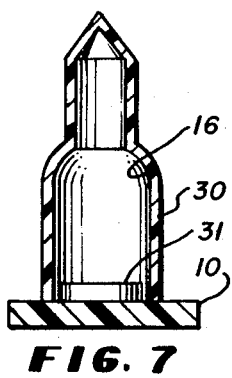

In FIG. 6, two indicators 26 and 27 in housings 11 are mounted on a base 10. The indicators 26 and 27 may be distinguished by different colors which may also indicate different poles on each indicator. The embodiment of FIG. 7 shows that the housing 30 may be of any desired form for certain games provided the side walls function to confine the indicator 31 as heretofore explained.

Figure 8:
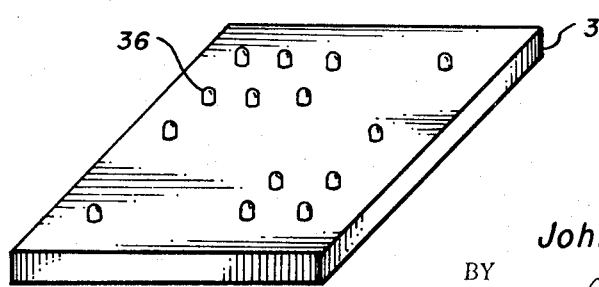
FIG. 8 is an isometric view of a display board and a plurality of indicators mounted thereon, which may be controlled by movable external poles or by electro-magnetic coils in which the polarity can be reversed.

FIG. 8 shows an electronic display board 35 on which are mounted housings 36 which enclose indicators such as hereinabove described, operable by either external permanent magnets or electro-magnetic devices located beneath the board or elsewhere within the magnetic field between the members.

The modifications shown and described herein are submitted to illustrate some of the various uses to which the invention may be applied for identifying polarity of magnetic subjects and for playing a variety of games wherein the indicator's response is based on the polarity of an external magnetic pole member.

I claim:
1. A magnetic pole indicator comprising
   (a) a permanently magnetic indicator having opposite polar major side surfaces,
   (b) a housing having a wall through which the indicator is visible,
   (c) said indicator being loosely contained within said housing while having no physical connection therewith, and
   (d) a magnetic pole located externally of the said housing for exerting attractive or repellant magnetic influence relatively to said indicator,
   said indicator being freely movable within and confined by said housing within the magnetic field between said indicator and external pole member, whereby said indicator is caused to turn over from one major side surface to the other when the external pole is in pole repelling position relatively to said indicator and thus visually indicates which of its polar sides is like or unlike the facing pole of the external pole.

2. The magnetic pole indicator defined by claim 1, in which the indicator is a circular disc and the internal dimensions of the housing are greater than the diameter of the disc.

3. The magnetic pole indicator defined by claim 1, in which the housing is made of non-conductive insulating material which is sufficiently transparent to visually expose the indicator.

4. The magnetic pole indicator defined by claim 1, in which the indicator has its opposite sides marked by distinguishing colors, symbols, numerals or other markings to indicate opposite poles.

5. The magnetic pole indicator defined by claim 1, which includes means for reversing the polarity of the external magnetic pole.

6. The magnetic pole indicator defined by claim 1, in which the indicator is a circular disc and one major side surface is larger in diameter than the opposite major side surface.

References Cited

UNITED STATES PATENTS

| | | | |
|---|---|---|---|
| 2,585,974 | 2/1952 | Taylor et al. | 324—34 |
| 2,772,392 | 11/1956 | Mohr | 324—48 |
| 2,930,974 | 3/1960 | From | 324—48 |

RUDOLPH V. ROLINEC, Primary Examiner

R. J. CORCORAN, Assistant Examiner

U.S. Cl. X.R.

273—137